Sept. 6, 1955      T. E. WOODRUFF      2,717,310

DIRECT CURRENT ELECTRONIC INTEGRATING SYSTEM

Filed Nov. 13, 1952      3 Sheets-Sheet 1

INVENTOR.
THOMAS E. WOODRUFF,
BY
Nicholas T Volm
ATTORNEY.

FIG. 3.

United States Patent Office 2,717,310
Patented Sept. 6, 1955

2,717,310

DIRECT CURRENT ELECTRONIC INTEGRATING SYSTEM

Thomas Ellis Woodruff, Los Angeles, Calif., assignor, by mesne assignments, to Hughes Aircraft Company, a corporation of Delaware Application November 13, 1952, Serial No. 320,311

18 Claims. (Cl. 250—27)

This invention relates to electronic integrating systems and more particularly to an electronic system for integrating with high precision varying direct currents and suitable for use in electronic analog computers.

A conventional direct-current (D. C.) integrator generally develops an output signal having a value proportional to the time integral of the algebraic sum of variable D. C. voltages impressed thereon.

Basic integrating circuits in current use comprise an integrating capacitor charged with a time-varying voltage through a resistor in series with the source of voltage. Such a circuit performs a true integration for comparatively rapid variations of the voltage to be integrated. As is well known, the charging curve of a capacitor normally has a non-linear slope. It is conventional practice to approximate a linear slope by utilizing only the initial portions of the charging slope where the linearity is comparatively good. This, however, does not permit extremely high precision although it is satisfactory for general commercial practice.

For low rates of change of the voltage impressed on an integrating circuit the integration accuracy of the circuit is impaired due to such factors as the complex leakage reactance and leakage resistance of the integrating capacitor and accompanying zero drift of the integrating circuit. These factors may result in non-linear charging of the integrating capacitor. The various causes of non-linearity have in the past been corrected, as a group, by connecting the integrating capacitor across a D. C. amplifier to form a degenerative feedback path from the output of the D. C. amplifier to the input. By this technique the linearity of the charging slope of the integrating capacitor has been greatly improved. Notwithstanding, the extreme accuracy has still not been achieved that is desirable for high precision computing as required in automatic air and sea navigational apparatus and in precision electronic analog computers employed in other fields.

The important factors that must be controlled in D. C. integrators employing integrating amplifiers are: input zero drift, gain stability, and fidelity of response of the output signal with respect to the input voltage of the amplifiers, and the complex leakage reactance variation of the integrating capacitor. Direct-current amplifiers are known to have considerable zero drift, but the other factors are more readily controlled. Hence, attempts have been made to reduce the zero drift factor. Despite the use of various stabilization techniques, the best D. C. amplifiers have heretofore still exhibited residual zero drift. Employing the principles of this invention, zero drift can be controlled to a much higher degree.

In the voltage integrating system, according to this invention, an input voltage in the form of a time-varying D. C. of either positive or negative polarity is applied to the input circuit of the system. One output signal that may be derived from the integrating system is a D. C. voltage linearly proportional to the time integral of the input voltage. Another output signal from the system of this invention may be a series of pulses, the total number of which is linearly proportional to the time integral of the input voltage. The latter output signal applied through additional apparatus, forming part of the integrating system, may be employed to drive a stepping motor. The shaft rotation of the stepping motor, when driven in response to the output pulses of the integrating system, will have a direction indicative of the polarity of the input voltage and an angular rotation linearly proportional to the time integral of the input voltage. The shaft of the stepping motor may be coupled to means connected with suitable voltage sources so that the rotating shaft provides an output voltage representative of the integrated input voltage.

In the integrating system of this invention the varying D. C. input voltage to be integrated is applied to an integrating storage capacitor connected to the voltage source in series with a resistor. The integrating storage capacitor is connected across a novel highly stable D. C. amplifier. The D. C. amplifier of the invention has a gain characteristic which is a function of frequency. Thus its gain is extremely high for low frequency variations in input voltage where considerable zero drift is encountered, and is much lower for higher frequencies where the drift factor is not encountered. The integrating circuit so connected provides a more linear charging curve with respect to time for the integrating capacitor. The capacitor accordingly provides a degenerative feedback path for the highly stable D. C. amplifier.

The output signal of the integrating circuit is a D. C. voltage accurately corresponding to the time integral of the varying D. C. input voltage. This output signal is applied simultaneously to two relay-drive pulse-generator channels. The first of these relay-drive pulse-generator channels is responsive to a negative integrator output signal of predetermined level. The second relay-drive pulse-generator channel is responsive to a positive integrator output signal of predetermined level. Each relay-drive pulse-generator channel has two output circuits. Referring to the first relay-drive pulse-generator channel, one output circuit provides a first positive pulse each time the relay-drive pulse-generator channel responds to the integrator output voltage of predetermined level and polarity from the integrating circuit. The second output circuit is arranged to energize a first relay. Accordingly, there is provided a first positive output pulse and means to energize the first relay each time the integrating circuit provides an output voltage of the predetermined polarity and level. The second relay-drive pulse-generator channel is identical with the first providing a second positive output pulse and means for energizing a second relay in response to the output voltage from the integrating circuit of opposite polarity and predetermined amplitude.

The first and second relays act selectively upon a charge transfer circuit to charge a charge transfer storage capacitor to a voltage of a polarity dependent upon which one of the relay channels is energized. The relays operate in response to the polarity of the integrated voltage output. Upon the operation of the appropriate relay, the charge transfer storage capacitor is charged from a source of charging potential having an opposite polarity and equal amplitude to that appearing on the integrating capacitor to cancel the charge previously existing on the integrating capacitor.

The output pulses of the relay-drive pulse-generator channels may be applied to a drive circuit for energizing a stepping motor. These pulses are derived from the output of monostable multivibrator circuits in the relay-drive pulse-generator channels. The stepping motor has a notched rotor arranged to be driven one step each time that either of the relay-drive pulse-generator channels is energized. A stepping motor of the type which may be utilized in the system of this invention is disclosed and claimed in Patent Number 2,627,040, issued January 27, 1953, to S. Hansen for a "Stepping Motor."

The direction of rotation of the stepping motor is determined by which of the relay-drive pulse-generator channels is energized through the operation of the stepping motor drive circuit. Positive pulses developed by the relay-drive pulse-generator channel in response to a negative charge on the integrating storage capacitor are applied to the stepping motor drive circuit to initiate motion in one direction. Similarly, positive pulses derived from the relay-drive pulse-generator channel in response to a positive charge on the integrating storage capacitor are applied to the stepping motor drive circuit to initiate rotation of the stepping motor in the opposite direction. The motion of the stepping motor shaft is thus a resultant output function of the integrating system and the angular rotation, or other motion produced by the motor shaft is linearly proportional to the integral of the time-varying D. C. input voltage. The direction of rotation is determined by the polarity of the input voltage.

The output pulses of the relay-drive pulse-generator channels may be considered as a final output signal of the system if no stepping motor is to be used. These pulses may be applied directly to some utilization circuit. The relay-drive pulse-generator channels operate selectively in response to the polarity of the time-varying D. C. voltage to be integrated. A positive voltage at the integrating capacitor results in a first series of pulses from the appropriate channel having a repetition rate linearly related to the input voltage. A negative voltage at the integrating capacitor results in another series of pulses having a repetition rate linearly related to the input voltage. The total number of pulses from either channel is linearly proportional to the integral with respect to time of the time-varying D. C. input voltage. Thus there are provided separate channels, each responsive to one polarity of the input voltage.

It is an object of this invention to provide an electronic D. C. integrating system for integrating a variable D. C. input voltage which develops output pulses accurately and linearly related to the time integral of the variable D. C. input voltage and adapted to be utilized for driving a stepping motor.

It is a further object of this invention to provide an electronic D. C. integrating system in which two output channels are provided, each of which delivers positive pulses accurately and linearly related in number to the time integral of a time-varying D. C. input voltage, the two channels being selectively responsive to the polarity of the input voltage.

It is another object of this invention to provide an electronic D. C. integrating system which develops a series of pulses having a repetition rate linearly related to the time-varying amplitude of an input voltage.

Still a further object of this invention to provide, in an electronic D. C. integrating system, a D. C. amplifier to reduce the input voltage drift by providing considerably greater feedback through the use of a different type amplifier having smaller drift for the lower rates of change of the input signal in which the drift is normally large than for higher rates of change where the drift is normally negligible.

Still another object of this invention is to provide, in a D. C. electronic integrating system, a selective sequencing drive circuit for a stepping motor to be actuated by the electronic D. C. integrating system.

These and other objects and advantages of this invention will become apparent from the following description taken together with the accompanying drawings in which.

Figure 1:
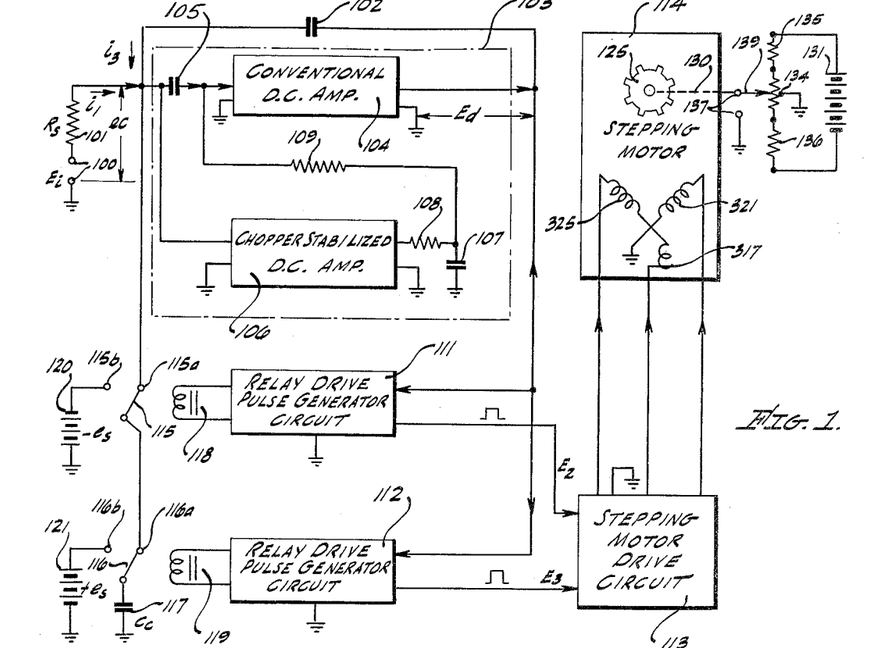
Fig. 1 is a schematic diagram of a D. C. electronic integrating system embodying the present invention.

Referring now to the drawings, and particularly to Fig. 1, there is shown an integrating circuit comprising input terminals 100, a resistor 101, a charging capacitor 102 and a composite feedback D. C. amplifier generally indicated by block 103. A time-varying D. C. input voltage $E_1$ to be integrated is impressed on input terminals 100. The composite D. C. amplifier 103 comprises a coupling capacitor 105, a conventional D. C. amplifier 104 including a grid leak resistor 109 and a chopper-stabilized D. C. amplifier generally indicated at 106. The chopper-stabilized amplifier 106 is of the general type disclosed, for example, in the F. L. Moseley et al., Patent 2,459,177.

The composite feedback D. C. amplifier 103 is connected across charging capacitor 102, so that capacitor 102 forms a degenerative feedback path from the output of the amplifier 103 back to its input. The input of conventional D. C. amplifier 104 included within the composite feedback D. C. amplifier 103 is coupled to the junction of resistor 101 and capacitor 102 through a coupling capacitor 105. The capacitance value of coupling capacitor 105 is such that it presents a high reactance to low-frequency currents. For the purposes of this invention low frequencies may be defined as those voltage variations occurring at the integrator input which are primarily within the range of less than 10 cycles per second and particularly voltage variations having a period less than one cycle per second. Voltage variations which occur at rates in excess of 10 cycles per second pass more readily across coupling capacitor 105 and hence substantially by-pass the chopper-stabilized D. C. amplifier 106, whereas voltage variations of one cycle per second or less are substantially blocked by capacitor 105.

The output of conventional D. C. amplifier 104 is also the output of the integrating circuit which comprises resistor 101 and charging capacitor 102. The chopper-stabilized D. C. amplifier 106 is so connected as to be effectively in parallel with coupling capacitor 105. The input of chopper-stabilized D. C. amplifier 106 is also connected to the junction of the integrating circuit comprising resistor 101 and capacitor 102.

Since chopper-stabilized D. C. amplifier 106 is connected in parallel across coupling capacitor 105, coupling capacitor 105 blocks low-frequency voltage variations which appear at the input to the integrator circuit, including composite feedback D. C. amplifier 103. Consequently, these low-frequency voltage variations are impressed upon and amplified by chopper-stabilized D. C. amplifier 106, the output signals of which are applied to and further amplified by the conventional D. C. amplifier 104 to produce an output signal of higher output amplitude for the low-frequency voltage variation than for higher frequency voltage variations. The higher frequency input voltage is impressed on the conventional D. C. amplifier 104 through the coupling capacitor 105 so that these input voltages are amplified only by conventional D. C. amplifier 104. The chopper-stabilized amplifier 106 is by-passed due to the fact that a filter resistor 108 and capacitor 107 in the output of the amplifier 106 provides a low impedance path to ground.

What has been described so far is a D. C. integrating circuit, which, upon the application of a time-varying D. C. voltage $E_1$ to its input terminals 100, delivers an output voltage $E_d$ (shown in Fig. 1) that is exactly linearly proportional to the integral of the input voltage with respect to time.

The accurate relationship between the input and the output signals is due to the fact that the charging slope of the integrating capacitor 102 has been made extremely linear by virtue of the operation of the highly stable D. C. amplifier 103, as described in detail. This has the effect of providing correction for the more prevalent conditions of non-linearity due to zero drift having extremely long periods of variation. Furthermore, correction is provided to a relatively smaller degree for the higher frequency rates of change, where there is less likelihood of zero drift. This tends to establish and maintain the zero level at the junction of resistor 101 and capacitor 102 with a high degree of accuracy.

In the literature of the electronic integrator art values of integration accuracy approaching 0.1% are reported which is considered exceptionally good. With the system of this invention, by virtue of the circuit arrangement disclosed above, accuracies of 0.01% have been accomplished for low levels of the time-varying input voltage. A drift accuracy of $10^{-7}$ of the maximum input voltage has been maintained, but the accuracy for other combinations of resistor 101 and capacitor 102 can be many orders of magnitude better with respect to drift and linearity.

An example may be considered where the input voltage has a value of .01 volt. The drift factor may be controlled to a value of 1 microvolt, or, as shown above, 0.01% of the input voltage. Where the input voltage amplitude is 10 volts, the zero drift voltage is still maintained to a level of 1 microvolt, representing $10^{-7}$ of the input voltage.

The integrator output voltage $E_d$, proportional to the time integral of the input voltage $E_i$, is applied simultaneously to two relay-drive pulse-generator channels or circuits 111 and 112. Each of the relay-drive pulse-generator channels comprises a monostable multivibrator arranged to deliver a positive pulse when triggered. The same multivibrator is utilized to energize a relay coincidently with the generation of the pulse. Relay-drive pulse-generator circuit 111 actuates relay 118 which has contacts 115a and 115b and an armature or contact arm 115 shown in the de-energized position.

Relay-drive pulse-generator circuit 112 operates similarly to circuit 111 and actuates relay 119 that has a set of contacts 116a and 116b, and an armature 116 shown in the de-energized position.

Armature 116 of relay 119 is connected to one terminal of capacitor 117. The other terminal of capacitor 117 is grounded as shown. In the de-energized position armature 116 completes a series connection through contact terminal 116a, connected to armature 115 of relay 118 which, in the de-energized position, contacts terminal 115a connected to the junction of resistor 101 and integrating capacitor 102.

Contact terminal 116b of relay 119 is connected to the positive terminal of a source 121, providing a charging potential. Source 121 has its negative terminal grounded. Contact terminal 115b of relay 118 is connected to the negative terminal of a source 120, providing a charging potential. Source 120 has its positive terminal grounded.

Relay-drive pulse-generator circuit 111 is arranged to be triggered when the voltage $E_d$ is positive and reaches a predetermined value. Relay-drive pulse-generator circuit 112 is actuated when the voltage $E_d$ is negative and reaches a predetermined value. A positive output pulse $E_2$, shown in Fig. 1, is generated each time relay-drive pulse-generator circuit 111 is actuated. A positive output pulse $E_3$, also indicated in Fig. 1 is generated each time relay-drive pulse-generator circuit 112 is actuated. The pulses $E_2$ and $E_3$ are applied to stepping motor drive circuit 113 as will be hereinafter described.

The relays 118 and 119 form part of drive circuits 111 and 112 respectively, and operate a charge transfer circuit. Capacitor 117 is the charge transfer storage capacitor. A suitable fixed source of potential such as battery 121, having a polarity positive with respect to ground and another fixed source of potential 120 having a negative polarity with respect to ground are the charging sources for the charge transfer storage capacitor 117.

The operation of the charge transfer circuit may be clearly followed by reference to Fig. 1. Each time a predetermined value of charge appears across integrator charging capacitor 102, the integrator circuit produces an output voltage $E_d$. If this voltage $E_d$ is positive and reaches a predetermined value, relay-drive pulse-generator circuit 111 is actuated and relay 118 is energized, whereby armature 115 is momentarily removed from contact 115a to contact terminal 115b connected to the source of potential 120 having a negative polarity with respect to ground. Charge transfer storage capacitor 117 ($C_c$) is thereby charged from source 120 to a potential which equals the predetermined level at which voltage $E_d$ triggers the quiescent monostable multivibrator in relay-drive pulse-generator circuit 111. The circuit elements within circuit 111 are proportioned to set the time constant of the monostable multivibrator so that the operation of circuit 111 continues for a predetermined time producing a sharp output pulse and energizing relay 118 only for the predetermined time duration. At the termination of the predetermined time interval relay armature 115 is returned to contact 115a which is connected to the junction of the integrating storage capacitor 102 and resistor 101 whereby the charge just applied to charge transfer storage capacitor 117 cancels the charge on integrating storage capacitor 102 returning the junction of resistor 101 and capacitor 102 to the zero reference level whereupon a new integrating charge cycle begins.

When the voltage $E_d$ reaches a predetermined negative value the quiescent monostable multivibrator in the relay-drive pulse-generator circuit 112 is triggered to produce a positive pulse $E_3$ and to energize relay 119. Thereupon, the armature 116 of relay 119 is brought into engagement with contact 116b connected to potential source 121 having a positive polarity with respect to ground. In a similar manner to the operation of relay-drive pulse-generator circuit 111, the circuit 112, which is identical in all respects to circuit 111 except that it is responsive to a negative input signal, is triggered for a predetermined time interval during which charge transfer storage capacitor 117 charges up to the predetermined positive value of the storage potential source 121 equal to, but of opposite polarity to, the predetermined value of $E_d$ to which integrating storage capacitor 102 has previously been charged. When relay-drive pulse-generator circuit 112 returns to the quiescent state, relay 119 is de-energized and relay armature 117 is returned to contact 116a.

Hence, the charge previously applied to charge transfer storage capacitor 117 cancels the charge on integrating storage capacitor 102 returning the junction of resistor 101 and capacitor 102 to the zero reference level whereupon a new integrating charge cycle begins.

The operation of the relay-drive pulse-generator circuit 111 or 112 is initiated each time $E_d$ reaches the predetermined negative or positive value returning the junction of resistor 101 and capacitor 102 to the zero reference level so that the integrating storage capacitor 102 can once again charge up until it reaches the value $E_d$. The higher the amplitude of the input voltage $E_i$ of either polarity in a unit of time, the greater the number of times the appropriate relay-drive pulse-generator circuit is actuated. For any particular value of the input voltage $E_i$ there will be a corresponding number of operations of the relay-drive pulse-generator circuit 111 or 112 responsive to that polarity of the input voltage $E_i$. The value of $E_d$ for any integrating time interval will be proportional to the time integral of the input voltage $E_i$. As has been previously explained each time relay-drive pulse-generator circuit 111 operates, an output pulse $E_2$ is generated and each time relay-drive pulse-generator 112 operates, an output pulse $E_3$ is generated. There will therefore be a total number of pulses $E_2$ corresponding to the positive integrated voltage $E_d$ with respect to time of the positive input voltage $E_i$. Similarly, there will be a total number of pulses $E_3$ corresponding to the negative integrated voltage $E_d$ with respect to time of the negative input voltage $E_i$. A corollary condition with respect to the operation of the system of this invention is that the repetition rate or the number of pulses $E_2$ or $E_3$ occurring in a particular unit of time will be linearly related to the amplitude of the input voltage $E_i$.

The pulses $E_2$ or $E_3$ may be impressed on some utilization device independently of any of the devices to be described hereinafter and many such uses will readily occur to any one skilled in the art to which this invention appertains.

The operation of the D. C. electronic integrating system as decided so far is substantially as follows.

An input voltage $E_i$ applied to the input terminals 100 induces a current $i_1$ (see Fig. 1) through series resistor 101. The voltage at the junction of resistor 101 and capacitor 102 with respect to ground is $e_c$. The current $i_1$ can be expressed as follows:

$$i_1 = \frac{E_i - e_c}{R_s} \quad (1)$$

where $R_s$ is the resistance of resistor 101.

The charge $Q_a$ resulting from current $i_3$ (see Fig. 1) flowing through capacitor 102 ($C_f$) can be expressed:

$$Q_a = (E_d - e_c)C_f \quad (2)$$

When charge $Q_a$ reaches a predetermined value $Q_{at}$, the output voltage $E_d$ from the integrating circuit reaches a value $E_{dt}$. When $E_d$ reaches the value $E_{dt}$, the appropriate relay 118 or 119 (depending on the polarity of $E_{dt}$) is energized momentarily by the triggering of the multivibrator included in the relay-drive pulse-generator 111 or 112 to transfer a predetermined charge from capacitor 117 ($C_c$) to capacitor 102 ($C_f$), as hereinbefore described. The relay 118 will be energized if $E_i$ is positive. The relay 119 will be energized if $E_i$ is negative. The voltage $E_{dt}$ and the capacitance $C_f$ of capacitor 102 are selected so that the charge $Q_{at}$ of capacitor 102 is approximately equal to the charge transferred from capacitor 117 to capacitor 102 by relays 118 and 119 when the relay-drive pulse-generator circuit is energized.

The charge $Q_1$ applied to capacitor 117 ($C_c$) from either potential source 120 or 121 ($e_s$) is approximately equal in magnitude to the charge $Q_{at}$ and opposite in sign. The charge $Q_1$ is transferred to capacitor 102 leaving a close to zero net charge across it. The charge $Q_1$ across capacitor 117 ($C_c$) may be evaluated as follows:

$$Q_1 = (e_c - e_s)C_c \quad (3)$$

Since the charge transferred to capacitor 102 is opposite in sign and approximately equal in magnitude to the charge on capacitor 102, at the time of transfer the capacitor 102 is substantially discharged. The voltage $E_d$ approaches the zero reference level a number of times determined by the rate at which the input voltage $E_i$ charges capacitor 102. The sum of the currents $i_1$ and $i_2$ at the junction of capacitor 102 and resistor 101 is zero, where $i_2$ is the current caused by the charge transferred from capacitor 117 to capacitor 102 by operation of relays 118 or 119. Hence, since $i_1+i_2+i_3=0$ at all times and since on the average $i_3$ equals zero then, on the average, because no D. C. can flow through capacitor $C_f$ (102)

$$i_1 + i_2 = 0 \quad (4)$$

and $i_2$ must be a function of the frequency at which charge transfer relays 118 and 119 are operated, such that $$i_2 = -f_0(e_s - e_c)C_c \quad (5)$$

where $f_0$ is the frequency or rate of repetitive operations of the circuits 111 and 112.

If the voltage $e_c$ is made negligible, then by adding Equations 1 and 5 as in (4) a value of $f_0$ may be obtained as follows:

$$f_0 \approx \frac{E_i}{R_s C_c e_s} \quad (6)$$

Let $K_1$ be a proportionality constant:

$$K_1 = \frac{1}{R_s C_c e_s} \quad (7)$$

Substituting (7) in Equation 6 we have $$f_4 \approx K_1 E_i \quad (8)$$

For the time interval between charge transfer operations of relay 118 or 119

$$i_1 + i_3 = 0 \quad (9)$$

An insignificant leakage current flows through capacitors 105 and 102 and through the chopper switches of the chopper amplifier 106 which are periodically grounded. Since $$i_3 = \frac{d}{dt}Q_a$$

we obtain by equating the input currents from (1), (2) (9):

$$E_i - e_c + \frac{d}{dt}(E_d - e_c)C_f = 0 \quad (10)$$

Let $-u$ be the gain of the composite D. C. amplifier 103. Then $e_c u = E_d$ and we obtain from Equation 10

$$\frac{E_i + \frac{E_d}{u}}{R_s} = -\frac{d}{dt}\left(E_d + \frac{E_d}{u}\right)C_f \quad (11)$$

If $u$ is sufficiently high so that $$\frac{E_d}{u}$$

is insignificant compared to $E_d$ or $E_i$, then the term $$\frac{E_d}{u}$$

is negligible and may be omitted. The omission of these terms is justified by the fact that as $E_i$ decreases, the frequency of the varying D. C. impressed on the composite amplifier 103 is lower than the gain $u$ for that frequency is higher. From Equation 11

$$\frac{E_i}{R_s} \approx -\frac{d}{dt}E_d C_f \quad (12)$$

Integrating Equation 11:

$$E_d \approx -\frac{1}{R_s C_f}\int_0^t E_i dt \quad (13)$$

It is seen that when the gain of the composite feedback amplifier 103 is high enough, the output voltage $E_d$ is equal to a constant times the time integral of the input voltage $E_i$. This is shown by the curve 201 of Fig. 2, which illustrates the gain versus frequency response of the composite amplifier 103.

For very low frequencies below about 1 cycle per second corresponding to the drift rate of the conventional D. C. amplifier 104, the chopper-stabilized D. C. amplifier 106 is connected in cascade with amplifier 104. Thus, the effective zero drift of the effective input voltage $e_c$ of the composite amplifier is kept to an exceptionally low value by virtue of the degenerative feedback through capacitor 102. For low frequencies where the gain $-u$ is extremely high the approximation of Formula 13 is extremely accurate indicating a very linear relationship. To the drift voltage is added whatever inherent drift exists in the chopper-stabilized D. C. amplifier 106. Using this invention a drift factor as low as 1 microvolt has been achieved with an input resistor 101 having a resistance of 1 megohm.

Figure 2:
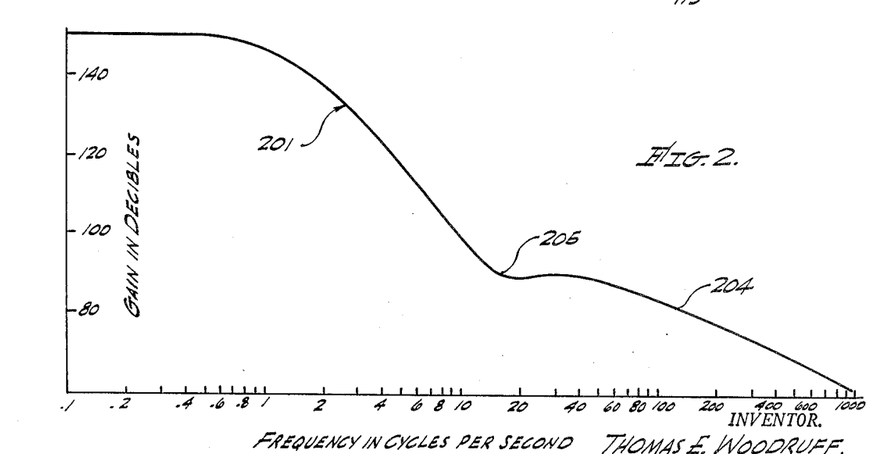
Fig. 2 is a frequency response characteristic curve of an integrating amplifier included in the diagram of Fig. 1.

At the rate of approximately 10 cycles a "crossover" point 205 occurs where the chopper-stabilized amplifier 106 is by-passed and the gain of the amplifier 103 then becomes essentially that of the conventional D. C. amplifier 104 as illustrated by curve position 204.

The stepping motor 114, illustrated in Fig. 1, comprises a rotor 125 having notches arranged to have predetermined spacing, a stator having poles arranged to be individually aligned with one notch or sets of notches of the rotor at any time, the poles being energized by current flowing through the stator coils 325, 321, or 317. The rotor 125 is coupled to a rotary shaft 130.

The stepping motor 114, representative of the type more fully described in the Hansen patent, is basically so constructed that the teeth of its notched rotor 125 have a separation such that alignment is only possible at any time with one of the stator poles. As this stator pole is energized by current flowing through its coil, the other stator poles in the de-energized condition are misaligned in such a way that it would be necessary to rotate the rotor either clockwise or counterclockwise to bring the associated rotor notches into alignment with either of the other poles. As the poles are energized and de-energized in sequence for any one direction of rotation, the rotor notches are pulled toward each energized pole in the same sequence to effect a rotation in response to pulses as hereinafter described.

Figure 3:
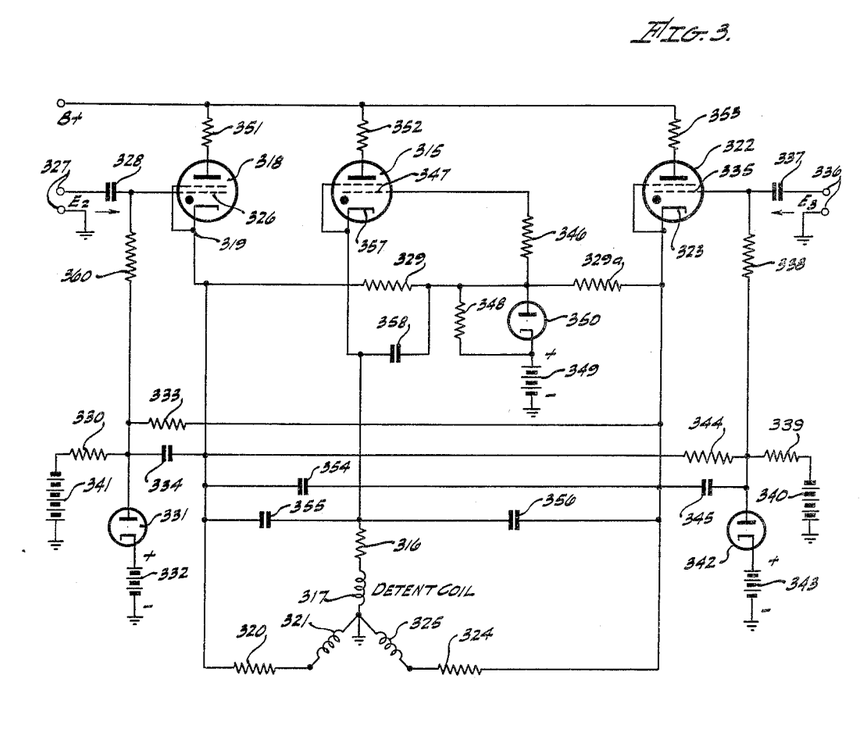
Fig. 3 is a schematic circuit diagram of a stepping motor drive circuit included in Fig. 1.

The stepping motor drive circuit 113, shown in block form in Fig. 1, is illustrated schematically in more detail in Fig. 3, to which reference is now made. The circuit of Fig. 3 generates the drive pulse voltage trains shown in Figs. 4a and 4b in response to output pulses $E_2$ or $E_3$, respectively, derived from the relay-drive pulse-generator channels 111 and 112 for operating stepping motor 114 (Fig. 1). A stepping motor which is suitable for use with this invention, is disclosed and claimed in the Hansen patent above referred to.

The circuit of Fig. 3 includes three thyratrons 318, 315 and 322. Each of the three thyratrons receives plate power from a common power source indicated at B+ and applied to the plates of the thyratrons through plate load resistors 351, 352 and 353 respectively. Cathode 357 of thyratron 315 is returned to ground through cathode load resistor 316 in series with detent stator coil 317 of the stepping motor 114. The cathode 319 of thyratron 318 is returned to ground through cathode load resistor 320 in series with stator coil 321 of the stepping motor 114. The cathode 323 of thyratron 322 is similarly returned to ground through load resistor 324 in series with stator coil 325. The control grid 326 of the thyratron 318 is coupled to a first pair of input terminals 327 through coupling capacitor 328. A grid leak resistor 329 is connected to grid 326 and to limiting resistor 330. First limiting diode 331, in series with first limiting diode bias source 332 is connected between the junction of resistors 329, 330 and ground, provides the grid return circuit for thyratron 318. A first negative hold-off bias from bias source 341 is applied to the control grid 326 of thyratron 318 through resistors 330 and 329.

A timing circuit, comprising resistor 333 and capacitor 334, is connected to the grid circuit of thyratron 318. Resistor 333 is connected between cathode 323 of thyratron 322 and grid leak resistor 329 of thyratron 318. The capacitor 334 is connected between grid leak resistor 329 and cathode 319 of thyratron 318. Grid 335 of thyratron 322 is coupled to a second input circuit 336 through coupling capacitor 337. Grid leak resistor 338 is connected between the grid 335 of thyratron 322 and limiting resistor 339. Second limiting diode 342, in series with second limiting diode bias source 343 is connected between the junction of resistors 338, 339 and ground, provides the grid return circuit for thyratron 322. A second negative hold-off bias from bias source 340, connected between ground and limiting resistor 339, is applied to the control grid 335 of thyratron 322 through resistors 339 and 338. A timing circuit, comprising resistor 344 and capacitor 345, is connected to the grid of circuit of thyratron 322. Resistor 344 is connected between cathode 319 of thyratron 318 and the grid leak resistor 338 of thyratron 322. The capacitor 345 is connected between grid leak resistor 338 and cathode 323 of thyratron 322. Grid leak resistor 346 is connected to the grid 347 of thyratron 315. Resistor 348 is a limiting resistor connected between grid leak resistor 346 and bias source 349 from which positive bias is applied to grid 347. Diode 350, connected in parallel with resistor 348, limits the grid voltage swing of thyratron 315 in the positive direction. The positive bias from source 349 renders thyratron 315 normally conducting in the absence of pulses applied to either first input circuit 327 or second input circuit 336. Resistor 329 is connected between the cathode 319 of the thyratron 318 and the junction of resistors 346, 348. Resistor 329a is connected between cathode 323 of thyratron 322 and the junction of resistors 346, 348. Capacitor 358 is connected between the junction of resistors 329, 329a and cathode 357 of thyratron 315 to form a timing circuit with either resistor 329 or with resistor 329a. Capacitor 354 couples cathode 319 of thyratron 318 to cathode 323 of thyratron 322. Capacitor 355 couples cathode 319 of thyratron 318 to cathode 357 of thyratron 315 while capacitor 356 couples cathode 323 of thyratron 322 to cathode 357 of thyratron 315.

The manner in which the stator poles of the stepping motor 114, energized in a predetermined sequence by current flowing through the motor stator coils 317, 321 and 325, draw the stepping motor rotor 125 one notch for each pulse, is more fully described in the aforementioned patent of S. Hansen.

Figure 4A:
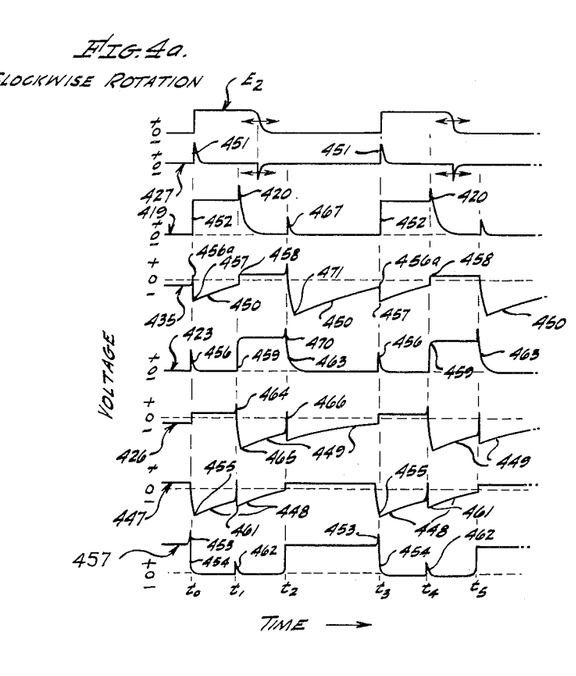
Figs. 4a and 4b are graphic illustrations of a group of voltage waveforms which appear at various points of the circuit of Fig. 3.
Figure 4B:
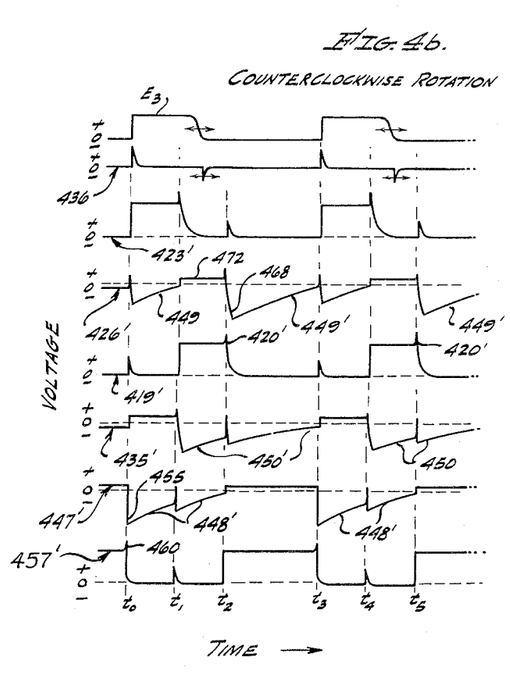

The operation of the circuit of Fig. 3, to perform the functions of driving a stepping motor of the type above-mentioned, may be better understood by reference to the voltage waveforms illustrated in Figs. 4a and 4b to which reference is now made in conjunction with the following description of the operation of the stepping motor drive circuit 113.

In Fig. 4a the voltage waveforms, for clockwise rotation of the stepping motor, are given specific reference symbols related to the thyratron electrodes where the voltages appear. For example wave 419 shows the voltage variation of cathode 319 through two cycles initiated by pulses $E_2$ for providing clockwise operation of the motor. In Fig. 4b waveforms for counterclockwise operation of the motor are similarly symbolized by prime numbers to refer to the voltages appearing on the appropriate electrodes of the thyratrons. Thus, wave 419' illustrates the voltage variation of cathode 319 through two cycles initiated by pulses $E_3$ for causing counterclockwise rotation of the stepping motor.

The time relation of the voltage variations at various points in the circuit of Fig. 3 in response to the application of pulses $E_2$ or $E_3$ to drive the stepping motor is indicated in Figs. 4a and 4b, thus intervals $t_0$ to $t_1$, and $t_1$ to $t_2$ are followed by identical intervals $t_3$ to $t_4$ and $t_4$ to $t_5$. The interval $t_0$ to $t_1$ is equal to the interval $t_1$ to $t_2$, but the interval $t_2$ through $t_3$ may be any period equalling $t_0$ to $t_1$ or greater. The interval $t_3$ to $t_5$ corresponds to the interval $t_0$ through $t_2$.

The description of the operation of the stepping motor drive circuit of Fig. 3 will be better understood by reference to the voltage waves illustrated in Figs. 4a and 4b.

In the absence of any pulses the stepping motor drive circuit of Fig. 3 is in the following condition: Thyratron 315 is normally maintained conducting or fired by the positive potential applied to the control grid 347 from bias source 349 (which may provide a voltage on the order of +13.5 volts) through isolation resistor 348 and grid leak resistor 346. Plate current, therefore, flows to ground through the thyratron 315, cathode load resistor 316 and detent stator coil 317. The current flowing through detent stator coil 317 energizes its associated detent pole in the stepping motor to hold the motor rotor 125 (Fig. 1) at a fixed position. Additionally, in the absence of any pulses applied to the input circuit 327 or to the input circuit 336 thyratron 318 is non-conducting or extinguished because a negative hold-off bias voltage from source 341 through limiting resistor 330 (which may provide a voltage at the junction of resistors 330 and 333 on the order of —36.5 volts) and grid leak resistor 329 is applied to control grid 326. Since thyratron 318 is non-conducting no current flows through cathode bias resistor 320 and stepping motor stator coil 321. Also, in the absence of any pulses, thyratron 322 is non-conducting because a negative hold-off bias voltage from source 340 through limiting resistor 339 (which may provide a voltage at the junction of resistors 339 and 344 on the order of —36.5 volts) and grid leak resistor 338 is applied to control grid 335 of thyratron 322. The bias voltages of batteries 349, 341 and 340, which have been noted above by way of example, may vary in accordance with the characteristics of the vacuum tubes employed. Hence, no current flows through cathode load resistor 324 and stepping motor stator coil 325. The rotor of the stepping motor is thus held in a rest position. The condition just described prevails during the interval $t_2$ through $t_3$, or prior to $t_0$ or following $t_5$.

For providing clockwise rotation of the stepping motor, initiated at time $t_0$, a positive pulse $E_2$, produced by relay-drive pulse-generator circuit 111, is applied to the first input circuit 327. A wave or train of voltage pulses 427 is derived from $E_2$ by differentiation through a differentiating network comprising capacitor 328 and resistor 329. Wave 427 represents the effective voltage applied to grid 326 from the source of pulses $E_2$. Upon the arrival at grid 326 of the leading edge 451 of the first positive going pulse of wave 427 the following simultaneous voltage conditions result at various points of the circuit in Fig. 3. As shown by the voltage wave 426 which exists at the control grid 326, the grid 326 of thyratron 318 becomes sufficiently positive to overcome the negative cutoff bias and to render thyratron 318 conducting; this occurs at the instant $t_0$. Hence, the current flowing through thyratron 318 develops a positive voltage across cathode load resistor 320 which is shown as leading edge 452 of wave 419 and which is impressed as a pulse 453 of wave 457 on cathode 357 of thyratron 315 through capacitor 355, as well as through capacitors 354 and 356 in series. Thereupon, the voltage at cathode 357 of thyratron 315 exceeds the anode voltage of thyratron 315 and the thyratron 315 is extinguished. The negative going trailing edge 454 of pulse 457 results from cessation of conduction of thyratron 315.

The accompanying drop in the current of thyratron 315 flowing through detent stator coil 317 releases the rotor 125 of the stepping motor. The motor stator pole associated with stator coil 321 is energized at instant $t_0$ by the current flowing through stator coil 321 due to the initiation of conduction through thyratron 318. The rotor 125 of the stepping motor is accordingly drawn one notch in the clockwise direction. When thyratron 315 ceases conduction, voltage of its grid 347 falls to a highly negative value 455, shown by grid voltage wave 447. At time $t_0$, the cathode 319 of thyratron 318 becomes quite positive, as shown by wave 419. A positive pulse 456 of wave 423 is impressed through capacitor 354, as well as through capacitors 355 and 356, on cathode 323 of thyratron 322. The pulse 456 of wave 423 is impressed through capacitor 345 on the junction of capacitor 345 and rectifier 342. Hence, the voltage at this junction is permitted to rise initially to substantially the potential of battery 343. Upon the occurrence of the trailing edge of pulse 456 the voltage at the junction of capacitor 345 and rectifier 342 goes in the negative direction by an amount equal to the amplitude of pulse 456 less the voltage of battery 343. This establishes a negative level which will always be the same substantially regardless of the initial voltage at the junction of capacitor 345 and rectifier 342. Capacitor 345 now charges through resistor 344 from the positive voltage of cathode 319 shown by wave 419 from instant $t_0$ until the grid 335 reaches a voltage which permits conduction of the thyratron 322 which occurs at the time $t_1$. The time constant of timing circuit 344 and 345, shorter than that of the timing circuit 329, 358 of thyratron 315, is determined by the values of resistor 344 and of capacitor 345.

During the interval $t_0$ to $t_1$ capacitor 358 charges in accordance with wave 447 as shown by charging curve 448. Capacitor 345 charges in accordance with wave 435, as hereinbefore described, and as shown by charging curve 457. Both capacitors 358 and 345 continue to be charged from cathode 319 through their respective resistors 329 and 344 until at the time $t_1$ capacitor 345 has charged to such a value as to render grid 335 of thyratron 322 momentarily sufficiently positive with respect to cathode 323 for ignition of thyratron 322. The voltage on cathode 323 of thyratron 322 subsequently becomes quite positive, as shown by curve 459, due to the conduction of the thyratron. The start of conduction of thyratron 322 results in current flow through stator coil 325.

The rise in voltage at the cathode 323, shown at 459, upon conduction of thyratron 322 is impressed upon the cathode 319 of thyratron 318 through capacitor 354 and through capacitors 356, 355 in series thereby raising the cathode voltage of thyratron 318 sufficiently above its anode voltage to extinguish thyratron 318, as can be seen by curve portion 420 of wave 419. At the cessation of current through thyratron 319, stator coil 321 is de-energized permitting the rotor 125 of stepping motor 114 to be drawn clockwise to align with the stator associated with stator coil 325. Since thyratron 315 is extinguished at the time $t_0$, a pulse 453 of wave 457, is developed at its cathode 357 which is impressed through capacitor 358 on the junction between capacitor 358 and rectifier 350. Accordingly, the voltage at this junction is permitted to rise initially to the potential of battery 349 but its further rise is limited by conduction of diode 350. Upon the occurrence of the trailing edge 454 of pulse 453, the voltage at the junction of capacitor 358 and rectifier 350 goes in the negative direction by an amount equal to the amplitude of the pulse 453 minus the voltage of battery 349.

In this manner, a predetermined negative voltage level greater than the negative level established at the junction of capacitor 345 and rectifier 342 regardless of the initial voltage of the junction of capacitor 358 and rectifier 350, is established at this junction. Capacitor 358 now charges through resistor 329 from the positive voltage of cathode 319, as shown by wave 447, until time $t_1$ when, upon the start of conduction of thyratron 322 a positive pulse 462, as on wave 457 from cathode 323, is applied through capacitor 356 as well as through capacitor 354, 355 in series to the cathode 357 of thyratron 315, charging capacitor 358 momentarily in a positive direction. Upon the occurrence of the trailing edge of the pulse 462, capacitor 358 discharges through resistor 316 and stator coil 317 to ground leaving capacitor 358 now at a negative level 461 on wave 447 equal to the amplitude of pulse 462 less the voltage of battery 349. Thereupon, capacitor 358 charges from the positive potential of cathode 323 through resistor 329a in accordance with wave 448 beginning at time $t_1$, until the grid 347 reaches a potential permitting conduction of thyratron 315 which occurs at time $t_2$.

The time constant of the timing circuit comprising resistor 324a and capacitor 358 is determined by the value of these components.

Also at time $t_1$ the positive pulse from cathode 323 is applied to the cathode 319 through capacitor 354 as well as through capacitors 356, 355 to charge capacitor 334 momentarily in a positive direction as shown at 464 on wave 426. Capacitor 334 then discharges through resistor 320 and stator coil 321 to ground leaving capacitor 334 at a negative level as shown at 465 on wave 426. Thereupon, capacitor 334 charges through resistor 333 from the positive voltage at cathode 323 in accordance with curve 449 shown on wave 426.

At time $t_2$, thyratron 315 begins to conduct. Consequently, its cathode potential rises and a pulse 467 is applied to cathode 319 of thyratron 318 from cathode 357 through capacitor 355 as well as through capacitors 356, 354 in series. A pulse 466 as shown on wave 426 is impressed through capacitor 334 on the junction of capacitor 334 and rectifier 331. Hence, the voltage at this junction is permitted to rise initially to substantially the potential of battery 332. Upon the occurrence of the trailing edge of pulse 466, the voltage at the junction of capacitor 334 and rectifier 331 goes in the negative direction by an amount equal to the amplitude of pulse 466 less the voltage of battery 332. This again establishes a negative level which will always be the same substantially regardless of the initial voltage at the junction of capacitor 334 and rectifier 331. Capacitor 334 now charges through resistor 330 from the negative voltage of cut-off bias battery 341 which is less negative than the level shown at 468 on wave 426. Since resistors 330, 333 and 324 and coil 325 form a voltage divider across the battery 341, capacitor 334 is charged from the potential appearing between the junction of resistors 333, 330 and ground. The charging of capacitor 334 is shown at 449 on wave 426, beginning at time $t_2$. The capacitor 334 does not reach a voltage sufficient to fire thyratron 318, because the voltage source 341 charges the capacitor 334 to a level below the cut-off bias. Consequently, thyratron 318 remains cut off until the arrival of a succeeding pulse at the input 327. Alternatively upon the initiation of a cycle of operation in the opposite direction thyratron 318 may be triggered at a subsequent time during the cycle.

Also at time $t_2$, with the start of conduction of thyratron 315, the rise in voltage at cathode 357 results in the application of a pulse 470 across capacitor 356 or capacitors 355, 354 to cathode 323 of thyratron 322 thereby raising the cathode voltage sufficiently above its anode voltage to extinguish thyratron 322 as can be seen by the curve portion 463 on wave 423. At the cessation of current through thyratron 322 stator coil 325 is de-energized releasing rotor 125 of stepping motor 114 to be drawn in a clockwise direction to alignment with the stator associated with detent stator coil 317.

At time $t_2$, the pulse 470 is also impressed through capacitor 345 on the junction of capacitor 345 and rectifier 342, permitting the junction voltage to rise momentarily to the level of battery 343. Upon the occurrence of the trailing edge of pulse 470, capacitor 345 discharges through resistor 324 and coil 325 to a negative level equal to the voltage amplitude of pulse 470 less that of battery 343. This negative level is substantially the same regardless of the initial voltage of the junction of capacitor 345 and rectifier 342.

Capacitor 345 thereupon charges through resistor 339 from the negative voltage of cut-off bias battery 340 which is less negative than the level shown at 471 on wave 435. Resistors 339, 344, 320 and coil 321 form a voltage divider across battery 340. Capacitor 345 is charged from the potential appearing between the junction of resistors 344, 339 and ground. Capacitor 345 does not reach a voltage sufficiently positive to fire thyratron 322 because the voltage source 340 charges the capacitor 345 to a level below the cut-off bias and so thyratron 322 remains cut off until the arrival of a pulse from source $E_3$ or is triggered at a subsequent time, during a clockwise cycle, as shown in Fig. 4a at 458 on wave 435.

Thus, at the resting condition of the drive circuit, thyratron 318 is cut off, thyratron 322 is cut off and thyratron 315 is conducting until the arrival of a subsequent pulse to either input circuit.

Reference is now made to the voltage waveforms of Fig. 4b representing voltages appearing at various points in the drive circuit 113 during a counterclockwise cycle of the stepping motor drive circuit. Counterclockwise rotation of the stepping motor is initiated by a pulse $E_3$ developed by relay-drive pulse-generator channel 112, and applied to the second input circuit 336 of the stepping motor drive circuit 113. Pulse $E_3$ is differentiated by network 337, 338 to develop a positive going pulse shown by wave 436. The first positive going pulse 436 triggers thyratron 322 resulting in current flowing through stator coil 325. Thereupon thyratron 315 is extinguished by the action of a pulse 460 from cathode 323 of thyratron 322 impressed on the cathode 357 of thyratron 315 through capacitor 356, as well as through capacitors 354 and 355. In the manner previously described, the thyratron 318 is subsequently ignited at time $t_1$ when thyratron 322 is extinguished. Timing circuit 333, 334 performs a timing function for thyratron 318 exactly in the same manner as does capacitor 345 and resistor 344 in connection with thyratron 322.

The order of conduction and extinction of the thyratrons for counterclockwise operation of the stepping motor drive circuit is as follows: At time $t_0$ a pulse 436 arriving at thyratron 322 extinguishes thyratron 315 and ignites thyratron 322 which continues to conduct until time $t_1$. Thereupon thyratron 318 is ignited and thyratron 322 extinguished. Thyratron 318 remains conducting until time $t_2$ whereupon thyratron 315 is again triggered to conduction and thyratron 318 extinguished. Thyratron 315 is prevented from being triggered at the time $t_1$ because at that time its cathode-grid bias is too negative for the thyratron 315 to be triggered by the positive pulse from the cathode 323 of thyratron 322 as previously described. The rotor 125 of the stepping motor 114 is thereby rotated through one counterclockwise step. A succeeding step is initiated on arrival of a subsequent pulse $E_3$.

It can be seen from the foregoing description that in the absence of pulses at input terminals 327 or 336 thyratron 315 is normally conducting, while thyratrons 318 and 322 are normally non-conducting. The application of a positive pulse impressed on thyratron 318, as hereinbefore described, results in a sequence of operation whereby thyratron 318 is ignited and thyratron 315 is extinguished. Then, after a predetermined time, thyratron 322 is ignited and thyratron 318 is extinguished, thyratron 315 remaining non-conducting for the reason previously set forth. Finally, after a time interval equal to the preceding interval, thyratron 315 is ignited again and thyratron 322 is extinguished, thyratron 318 remaining non-conducting. This condition prevails until a new pulse arrives. Thus, a clockwise step cycle is completed.

A positive pulse applied to thyratron 322, as hereinbefore described, results in the following sequence: thyratron 322 is ignited, and thyratron 315 extinguished. Then, after a predetermined time, thyratron 318 is ignited and thyratron 322 extinguished. Finally, after an equal time interval, thyratron 315 is re-ignited and thyratron 318 extinguished. This completes a counterclockwise cycle.

The stator coils 317, 321 and 325 are energized in sequence, when the thyratron to which each is connected is conducting, thereby to move the stepping motor rotor 125 one notch for each pulse. In the example of the motor of the Hansen application, the structure of the rotor and detent coil are such that the motion of the rotor effected by each thyratron during its operation is equal to one-third of a step, or notch.

While it is to be understood that the circuit specifications of the motor drive circuit of the invention may vary according to the design for any particular application, the following circuit constants for the motor drive circuit of Fig. 3 are included, by way of example only, as suitable for a pulse repetition not exceeding 100 pulses E₂ or E₃ per second:

| Component | Value |
|---|---|
| Thyratron 315 | Type 2D21. |
| Thyratron 318 | Type 2D21. |
| Thyratron 322 | Type 2D21. |
| Rectifier 331 | ½ Type 6AL5. |
| Rectifier 342 | ½ Type 6AL5. |
| Rectifier 349 | ½ Type 6AL5. |
| Voltage source 332 | +3 volts. |
| Voltage source 340 | Minus 175 volts. |
| Voltage source 341 | Minus 175 volts. |
| Voltage source 343 | +3 volts. |
| Voltage source 349 | +13.5 volts. |
| Resistor 316 | 5 kilohms. |
| Resistor 320 | 5 kilohms. |
| Resistor 324 | 5 kilohms. |
| Resistor 329 | .47 megohm. |
| Resistor 329a | .47 megohm. |
| Resistor 330 | 1.5 megohms. |
| Resistor 333 | .39 megohm. |
| Resistor 338 | 2.2 megohms. |
| Resistor 339 | 1.5 megohms. |
| Resistor 344 | .39 megohm. |
| Resistor 346 | 1.0 megohm. |
| Resistor 348 | 2.2 megohms. |
| Resistor 351 | 1 kilohm. |
| Resistor 352 | 1 kilohm. |
| Resistor 353 | 1 kilohm. |
| Resistor 360 | 2.2 megohms. |
| Capacitor 328 | .001 microfarad. |
| Capacitor 334 | .01 microfarad. |
| Capacitor 337 | .001 microfarad. |
| Capacitor 345 | .01 microfarad. |
| Capacitor 354 | .05 microfarad. |
| Capacitor 355 | .05 microfarad. |
| Capacitor 356 | .05 microfarad. |
| Capacitor 358 | .02 microfarad. |

The stepping motor 114 may further be employed to derive an output voltage as illustrated, for example, in Fig. 1, to which reference is now made. A circuit is associated with motor 114 and comprises a potentiometer 134 having a fixed center tap 138 which may be grounded. A variable or trap arm 139 of potentiometer 134 is connected to the shaft 130. To either end of potentiometer 134 a limiting resistor 135 and 136 is connected. A source of potential 131 is connected between resistors 135 and 136, the resistors limiting the current through potentiometer 134. Output terminals 137 are connected respectively to the variable arm 139 of potentiometer 134 and ground.

In operation, this circuit may be made to deliver an output voltage at terminals 137 either by direct rotation of the variable arm 139 of potentiometer 134 by the shaft 130 or through some appropriate gear reduction system coupled to shaft 130 of the stepping motor. The output voltage at terminals 137 is proportional to the integral of the input voltage in accordance with some predetermined proportionality constant established by the gear ratio.

What is claimed as new is:

1. An electronic integrating system for integrating a time-varying, direct-current potential, said system comprising: an electronic integrating network, including an integrating storage capacitor, whereby a time-varying, direct-current potential applied to said integrating network charges said integrating storage capacitor to develop an output voltage linearly proportional to the time integral of the time-varying, direct-current potential; a charge transfer capacitor; first means coupled to said capacitors and operable in response to said integrating storage capacitor being charged to a predetermined positive value, for substantially instantaneously charging said transfer capacitor to a predetermined negative value and for subsequently equalizing the charge of said capacitors, thereby to remove the positive charge across said integrating storage capacitor, said first means including a first output circuit for developing a positive pulse each time said integrating storage capacitor is charged to said positive value; and second means coupled to said capacitors and operable in response to said integrating storage capacitor being charged to a predetermined negative value, for substantially instantaneously charging said transfer capacitor to a predetermined positive value and for subsequently equalizing the charge of said capacitors, thereby to remove the negative charge across said integrating storage capacitor, said second means including a second output circuit for developing a positive pulse each time said integrating storage capacitor is charged to said negative value; the total number of said positive pulses from said first output circuit or from said second output circuit being linearly proportional to the integral with respect to time of the time-varying, direct-current potential.

2. An electronic integrating system for integrating a time-varying, direct-current potential, said system comprising: an electronic integrating network including an integrating storage capacitor, whereby a time-varying, direct-current potential applied to said integrating network charges said integrating storage capacitor to develop an output voltage linearly proportional to the time integral of the time-varying, direct-current potential; a charge transfer capacitor; a first source of voltage and a second source of voltage, each having a predetermined value; first means coupled to said capacitors and to said first source and operable in response to said integrating storage capacitor being charged to said predetermined value of positive polarity for substantially instantaneously connecting said capacitor to said first source to charge it to said predetermined value of negative polarity and for subsequently interconnecting said capacitors to remove the positive charge across said integrating storage capacitor, said first means including a first output circuit for developing a positive pulse each time said storage capacitor is charged to said positive value and second means coupled to said capacitor and to said second source and operable in response to said integrating storage capacitor being charged to said predetermined value of negative polarity for substantially instantaneously connecting said second source to said transfer capacitor to charge it to said predetermined value of positive polarity and for subsequently interconnecting said capacitors to remove the negative charge across said integrating storage capacitor; and said second means including a second output circuit for developing a positive pulse each time said storage capacitor is charged to said negative value, the total number of said positive pulses from either said first output circuit or from said second output circuit being proportional to the integral with respect to time of the time-varying, direct-current potential.

3. An electronic integrating system for integrating a time-varying, direct-current potential, said system comprising: an electronic integrating network including an integrating storage capacitor, whereby a time-varying, direct-current potential applied to said integrating network charges said integrating storage capacitor to develop an output voltage linearly proportional to the time integral of the time-varying, direct-current potential; a charge transfer capacitor; a first source of voltage and a second source of voltage, each having a predetermined value; first means coupled to said capacitors and to said first source and operable in response to said integrating storage capacitor being charged to said predetermined value of positive polarity for substantially instantaneously connecting said transfer capacitor to said first source to charge it to a predetermined value of negative polarity and for subsequently interconnecting said capacitors to remove the positive charge across said integrating storage capacitor, said first means including a first output circuit for developing a positive pulse each time said storage capacitor is charged to said positive value; and second means coupled to said capacitor and to said second source and operable in response to said integrating storage capacitor being charged to said predetermined value of negative polarity for substantially instantaneously connecting said second source to said transfer capacitor to charge it to said predetermined value of positively polarity and for subsequently interconnecting said capacitors to remove the negative charge across said integrating storage capacitor; said second means including a second output circuit for developing a positive pulse each time said storage capacitor is charged to said negative value, the total number of said positive pulses from either said first output circuit or from said second output circuit being proportional to the integral with respect to time of the time-varying, direct-current potential; a stepping motor drive circuit, having a first input circuit, and a second input circuit, said first input circuit of said motor drive circuit being coupled to said first output circuit, and said second input circuit of said motor drive circuit being coupled to said second output circuit, whereby positive pulses from said first means are impressed upon said first input circuit of said motor drive circuit and positive pulses from said second means are impressed upon said second input circuit of said motor drive circuit; and a stepping motor coupled to said stepping motor drive circuit and driven thereby so that positive pulses impressed on said first input circuit of said drive circuit initiate movement of said stepping motor in a predetermined direction and so that positive pulses impressed on said second input circuit of said drive circuit initiate movement of said stepping motor in the opposite direction, whereby the resulting movement of said stepping motor is proportional to the integral with respect to time of said time-varying, direct-current input potential.

4. In an electronic integrating system for integrating a time-varying, direct-current potential, and including an electronic integrating network having an integrating storage capacitor, whereby a time-varying, direct-current potential applied to said integrating network charges said integrating storage capacitor to develop an output voltage linearly proportional to the time integral of the time-varying, direct-current potential; a charge transfer circuit comprising: a charge transfer capacitor, a source of charging potential, first means coupled to said integrating storage capacitor and operable in response to the integrating storage capacitor being charged to a predetermined positive value, said first means including a relay circuit coupled to said source and to said charging transfer capacitor for momentarily switching said transfer capacitor to said source to charge said charge transfer capacitor to said predetermined value of negative polarity and thereafter to switch said charge transfer capacitor to the integrating storage capacitor, to substantially discharge the charge of positive value on said integrating storage capacitor, and a first output circuit coupled to said first means for developing a first series of positive pulses each time said storage capacitor is charged to said positive value; second means coupled to said integrating storage capacitor and operable in response to the integrating storage capacitor being charged to a predetermined negative value, said second means including a relay circuit coupled to said source and to said charge transfer capacitor for momentarily switching said charge transfer capacitor to said source to charge said charge transfer capacitor to said predetermined value of positive polarity and thereafter to switch the charge transfer capacitor to the integrating storage capacitor to substantially discharge the charge of negative value on said integrating storage capacitor, and a second output circuit coupled to said second means for developing a second series of positive pulses each time said storage capacitor is charged to said negative value.

5. An electronic integrating system for integrating a time-varying, direct-current potential, said system comprising: an electronic integrating network including an integrating storage capacitor, whereby a time-varying, direct-current potential applied to said integrating network charges said integrating storage capacitor to develop an output voltage linearly proportional to the time integral of the time-varying, direct-current potential; a charge transfer capacitor; first means, coupled to said capacitors and operable in response to said integrating storage capacitor being charged to a predetermined positive value for substantially instantaneously charging said transfer capacitor to a predetermined negative value and for subsequently equalizing the charge of said capacitors, thereby to remove the positive charge across said integrating storage capacitor, said first means including a first output circuit for developing a first train of positive pulses, each being produced in response to said storage capacitor being charged to said positive value; second means coupled to said capacitors and operable in response to said integrating storage capacitor being charged to a predetermined negative value for substantially instantaneously charging said transfer capacitor to a predetermined positive value and for subsequently equalizing the charge of said capacitors, thereby to remove the negative charge across said integrating storage capacitor, said second means including a second output circuit for developing a second train of positive pulses, each being produced in response to said storage capacitor being charged to said negative value, the total number of said positive pulses being linearly proportional to the integral with respect to time of the time-varying, direct-current potential; a stepping motor drive circuit having a first input circuit and a second input circuit; said first input circuit of said motor drive circuit being coupled to said first output circuit to impress said first train of pulses thereon, and said second input circuit of said motor drive circuit being coupled to said second output circuit to impress said second train of pulses thereon; and a stepping motor including a rotor shaft, said stepping motor being coupled to said motor drive circuit to drive said motor to initiate angular rotation of said rotor shaft in response to said train of pulses, whereby angular rotation of said rotor shaft is a function of the integral with respect to time of said time-varying, direct-current potential.

6. An electronic integrating system for integrating a time-varying, direct-current potential, said system comprising: an electronic integrating network including an integrating storage capacitor, whereby a time-varying, direct-current potential applied to said integrating network charges said integrating storage capacitor to develop an output voltage linearly proportional to the time integral of the time-varying, direct-current potential; a charge transfer capacitor; first means, coupled to said capacitors and operable in response to said integrating storage capacitor being charged to a predetermined positive value for substantially instantaneously charging said transfer capacitor to a predetermined negative value and for subsequently equalizing the charge of said capacitors, thereby to remove the positive charge across said integrating storage capacitor, said first means including a first output circuit for developing a first train of positive pulses, each being produced in response to said storage capacitor being charged to said positive value; second means coupled to said capacitors and operable in response to said integrating storage capacitor being charged to a predetermined negative value for substantially instantaneously charging said transfer capacitor to a predetermined positive value and for subsequently equalizing the charge of said capacitors thereby to remove the negative charge across said integrating storage capacitor, said second means including a second output circuit for developing a second train of positive pulses, each being produced in response to said storage capacitor being charged to said negative value, the total number of said positive pulses being linearly proportional to the integral with respect to time of the time-varying, direct-current potential; a stepping motor drive circuit having a first input circuit and a second input circuit; said first input circuit of said motor drive circuit being coupled to said first output circuit to impress said first train of pulses thereon, and said second input circuit of said motor drive circuit being coupled to said second output circuit to impress said second train of pulses thereon; a stepping motor including a rotor shaft, said stepping motor being coupled to said motor drive circuit to drive said motor to initiate angular rotation of said rotor shaft in response to said train of pulses, whereby angular rotation of said rotor shaft is a function of the integral with respect to time of said time-varying, direct-current potential; a source of potential, and a potentiometer having a variable tap and a fixed tap, both being connected intermediate its ends, said potentiometer being connected across said source of potential, said variable tap being coupled in driving relation to said rotor shaft, whereby rotation of said motor moves said variable tap with respect to said fixed tap of said potentiometer to provide an output voltage between said fixed tap and said variable tap indicative of the integral with respect to time of said time-varying, direct-current potential.

7. In an electronic integrating system for integrating a time-varying, direct-current potential, an electronic integrating network adapted to be connected to a source of time-varying, direct-current potential and including a resistor and a storage capacitor connected in series; a first direct-current amplifier, a coupling capacitor for coupling said first direct-current amplifier across said storage capacitor, said first direct-current amplifier providing amplification for higher frequencies of variation of the direct-current potential and discrimination against lower frequencies of variation of the direct-current potential; and a second chopper-stabilized amplifier providing a highly stable direct-current amplifier and connected directly across said coupling capacitor and providing amplification for said lower frequencies of said variations, said first and second direct-current amplifiers providing in combination a composite direct-current integrating amplifier having a gain for said lower frequencies of said variations equal to the product of the amplifications of said first and second direct-current amplifiers and having a gain for said higher frequencies of said variations equal to the amplification of said first direct-current amplifier alone, said coupling capacitor bypassing said second amplifier for said higher frequencies.

8. In an electronic integrating system for integrating a time-varying, direct-current potential, an electronic integrating network adapted to be connected to a source of time-varying, direct-current potential and including a resistor and a storage capacitor connected in series; a first direct-current amplifier coupled across said storage capacitor, a coupling capacitor for connecting said first direct-current amplifier to the junction of said resistor and storage capacitor, said first direct-current amplifier providing amplification for higher frequencies of variation of the direct-current potential; and a second chopper-stabilized amplifier providing a highly stable direct-current amplifier and connected directly across said coupling capacitor and providing amplification for lower frequencies of said variations, said first and second direct-current amplifiers providing in combination a composite direct-current integrating amplifier having a gain for said lower frequencies of said variations equal to the product of the amplifications of said first and second direct-current amplifiers and having a gain for said higher frequencies of said variations equal to the amplification of said first direct-current amplifier alone.

9. In an electronic integrating system, an integrating network, an integrating amplifier comprising a first and a second direct-current amplifier, a capacitor for coupling said first direct-current amplifier to said integrating network, said second direct-current amplifier being connected across said capacitor, said integrating amplifier having greater gain at predetermined low frequencies than at higher frequencies, whereby said integrating amplifier provides greater feedback for said integrating network at said low frequencies to linearize the integrating action of said integrating network.

10. In an electronic integrating system, an integrating network comprising a resistor and an integrating storage capacitor connected in series, an integrating amplifier connected across said integrating storage capacitor and comprising a first and a second direct-current amplifier, a coupling capacitor for coupling said first direct-current amplifier to said integrating network, said second direct-current amplifier being connected across said coupling capacitor, said integrating amplifier having greater gain at predetermined low frequencies than at higher frequencies, whereby said integrating amplifier provides greater feedback for said integrating network at said low frequencies to linearize the integrating action of said integrating network.

11. An integrating amplifier comprising a first direct-current amplifier; a coupling capacitor; and a second direct-current amplifier connected across said capacitor; said capacitor and said first direct-current amplifier being connected in series with respect to an input signal impressed on said integrating amplifier, whereby said integrating amplifier provides greater amplification for lower signal frequencies than for higher signal frequencies.

12. A composite amplifier comprising a first direct-current amplifier; a coupling impedance element; and a second direct-current amplifier connected across said coupling impedance element; said coupling impedance element and said first direct-current amplifier being connected in series with respect to an input signal impressed on said integrating amplifier, said coupling impedance element and said first direct-current amplifier providing amplification for higher signal frequencies and said second direct-current amplifier providing greater amplification for lower signal frequencies than for higher signal frequencies whereby greater signal frequency amplification is provided at said lower frequencies than at said higher frequencies.

13. In an integrating system, the combination with a stepping motor having a notched rotor and a series of stator inductors disposed in driving relation to said rotor, said rotor being actuated by current flowing in predetermined sequence through said stator inductors for moving said rotor in a predetermined direction one notch at a time, of a drive circuit for said motor comprising a first, a second, and a third gas-filled discharge device, each having at least a cathode, a grid, and an anode, said stator inductors being individually connected in the anode-cathode circuits of said devices, a first, a second, and a third resistance-capacitance timing network, each being individually coupled to one of said three devices for providing predetermined time delays, said first device having a grid circuit for coupling to a first source of positive pulses, said third device having a grid circuit for coupling to a second source of positive pulses, means rendering said second device conducting in the absence of said pulses, means coupling said first device to said second device and coupling said second device to said third device, and coupling said first device to said third device, and means for energizing said first and said third devices and for rendering them nonconducting in the absence of said pulses, whereby upon the arrival of a pulse from said first source on the grid circuit of said first device, said first device is rendered conducting for a period of time determined by its associated timing network, and simultaneously said second device is rendered nonconducting, and upon said first device being rendered nonconducting said third device is rendered conducting for a period of time determined by its associated time constant, and upon said third device being rendered nonconducting said second device is rendered conducting again to energize sequentially the stator inductors associated with said second, first, and third devices, and whereby upon the arrival of a pulse from said second source on the grid circuit of said third device the stator inductors associated with said second, third, and first devices are sequentially energized, thereby to drive said motor in a first predetermined direction upon the arrival of a pulse from said first source and in the opposite direction upon the arrival of a pulse from said second source.

14. An electronic three-period sequencing circuit comprising a first, a second, and a third gas-filled discharge device, each having at least a cathode, a grid, and an anode, load impedance elements individually connected in the anode-cathode circuits of said devices, a first, a second, and a third resistance-capacitance timing network, each being individually coupled to one of said three devices for providing predetermined time delays, said first device having a grid circuit for coupling to a first source of positive pulses, said third device having a grid circuit for coupling to a second source of positive pulses, means rendering said second device conducting in the absence of said pulses, means coupling said first device to said second device and coupling said second device to said third device, and for coupling said first device to said third device, and means for energizing said first and said third devices and for rendering them nonconducting in the absence of said pulses, whereby upon the arrival of a pulse from said first source on the grid circuit of said first device, said first device is rendered conducting for a period of time determined by its associated timing network, and upon said first device being rendered nonconducting said third device is rendered conducting for a period of time determined by its associated time constant, and upon said third device being rendered nonconducting said second device is rendered conducting again to energize sequentially said load impedance elements associated with said second, first, and third devices, and whereby upon the arrival of a pulse from said second source on the grid circuit of said third device said load impedance elements associated with said second, third, and first devices are sequentially energized, thereby to energize said impedance elements in a first predetermined sequence upon the arrival of a pulse of said first source and in an opposite sequence upon the arrival of a pulse from said second source.

15. A timing circuit comprising an electron discharge device including a control circuit and a cathode-anode circuit; a storage capacitor having a first terminal connected to said control circuit and a second terminal connected to said cathode-anode circuit; means rendering said electron discharge device conducting in response to said storage capacitor having a predetermined voltage thereacross; a plurality of resistors of substantially equal resistance each having a first and a second terminal, the first terminals of said resistors being connected to said first terminal of said capacitor; a source of potential; and a plurality of networks normally nonconducting each individually connected to said second terminals of said resistors, said source being coupled between each of said networks and said second terminal of said storage capacitor, and each of said networks being rendered selectively conducting upon application of a pulse thereto to connect said source to its associated resistor, whereby upon conduction of one of said networks said storage capacitor is charged from said source through the associated resistor within a predetermined time interval determined by the time constant of said storage capacitor and the associated resistor to said predetermined voltage to render said electron discharge device conductive.

16. A circuit for sequentially energizing load impedance elements connected in operating relation to said circuit, said circuit comprising a first thyratron having at least a first grid, a first anode and a first cathode; a second thyratron having at least a second grid, a second anode and a second cathode; a third thyratron having at least a third grid, a third anode and a third cathode; a common junction point; a source of anode potential for energizing said thyratrons and having its negative terminal connected to said common junction point and its positive terminal connected to said anodes; means for maintaining said first thyratron normally nonconducting; means for applying a positive potential to said second grid to render said second thyratron conducting in the absence of conduction of either said first or said third thyratron; means for normally maintaining said third thyratron nonconducting; a first charging capacitor connected between said first grid and said first cathode; a first charging resistor connected between said first grid and said third cathode, said first charging capacitor and said first charging resistor comprising a first timing network for said first grid; a second charging capacitor connected between said second grid and said second cathode; a second and a third charging resistor of equal resistance, each having one end connected to said second grid, said second charging resistor having its other end connected to said first cathode, said third charging resistor having its other end connected to said third cathode, said second charging resistor forming a timing network with said second charging capacitor for said second thyratron when said first thyratron is conducting and said third charging resistor forming a timing network with said second charging capacitor for said second thyratron when said third thyratron is conducting; a third charging capacitor connected between said third grid and said third cathode; a fourth charging resistor connected between said third grid and said first cathode, said third charging capacitor and said fourth charging resistor forming a timing circuit for said third grid when said first thyratron is conducting; means for limiting the voltage at said first grid to a predetermined positive level; means for limiting the voltage at said third grid to a predetermined positive level; a first input circuit coupled to said first grid; a second input circuit coupled to said third grid; three cathode resistors; and three load impedance elements, each of said cathode circuits of said thyratrons being individually connected to said common junction point through one of said cathode resistors and one of said load impedance elements.

17. A circuit for sequentially energizing load impedance elements connected in operating relation to said circuit, said circuit comprising a first thyratron having at least a first grid, a first anode and a first cathode; a second thyratron having at least a second grid, a second anode and a second cathode; a third thyratron having at least a third grid, a third anode and a third cathode; a first, a second and a third diode; a common junction point; a source of anode potential for energizing said thyratrons and having its negative terminal connected to said common junction point and its positive terminal connected to said anodes; a first limiting resistor; means for normally maintaining said first thyratron nonconducting; a limiting resistor; a source of bias potential having its negative terminal connected to said common junction point and its positive terminal connected through the parallel connection of said second diode and said limiting resistor to said second grid to provide positive potential to said second grid to render said second thyratron conducting in the absence of conduction of either said first or said third thyratron; means for normally maintaining said third thyratron nonconducting; a first charging capacitor connected between said first grid and said first cathode; a first charging resistor connected between said first grid and said third cathode, said first charging capacitor and said first charging resistor comprising a first timing network for said first grid; a second charging capacitor connected between said second grid and said second cathode; a second and a third charging resistor of equal resistance, each having one end connected to said second grid, said second charging resistor having its other end connected to said first cathode, said third charging resistor having its other end connected to said third cathode, said second charging resistor forming a timing network with said second charging capacitor for said second thyratron when said first thyratron is conducting and said third charging resistor forming a timing network with said second charging capacitor for said second thyratron when said third thyratron is conducting; a third charging capacitor connected between said third grid and said third cathode; a fourth charging resistor connected between said third grid and said first cathode, said third charging capacitor and said fourth charging resistor forming a timing circuit for said thrid grid when said first thyratron is conducting; the positive terminal of said source of bias potential being connected to said first grid through said first diode, said first diode being poled to limit the voltage at said first grid to a predetermined positive level; the positive terminal of said source of bias potential being connected to said third grid through said third diode, said third diode being poled to limit the voltage at said third grid to a predetermined positive level; a first input circuit coupled to said first grid; a second input circuit coupled to said third grid; three cathode resistors; and three load impedance elements, each of said cathode circuits of said thyratrons being individually connected to said common junction point through one of said cathode resistors and one of said load impedance elements.

18. A circuit for sequentially energizing load impedance elements connected in operating relation to said circuit, said circuit comprising a first thyratron having at least a first grid, a first anode and a first cathode; a second thyratron having at least a second grid, a second anode and a second cathode; a third thyratron having at least a third grid, a third anode and a third cathode; a first, a second and a third diode; a common junction point; a source of anode potential for energizing said thyratrons and having its negative terminal connected to said common junction point and its positive terminal connected to said anodes; a first limiting resistor; a first source of bias potential for normally maintaining said first thyratron nonconducting and having its positive terminal connected to said common junction point and its negative terminal connected through said first limiting resistor to said first grid; a second limiting resistor; a second source of bias potential having its negative terminal connected to said common junction point and its positive terminal connected through the parallel connection of said second diode and said second limiting resistor to said second grid to apply positive potential to said second grid to render said second thyratron conducting in the absence of conduction of either said first or said third thyratron; a third limiting resistor; a third source of bias potential for normally maintaining said third thyratron nonconducting and having its positive terminal connected to said common junction point and its negative terminal connected through said third limiting resistor to said third grid; a first charging capacitor connected between said first grid and said first cathode; a first charging resistor connected between said first grid and said third cathode, said first charging capacitor and said first charging resistor comprising a first timing network for said first grid; a second charging capacitor connected between said second grid and said second cathode; a second and a third charging resistor of equal resistance, each having one end connected to said second grid, said second charging resistor having its other end connected to said first cathode, said third charging resistor having its other end connected to said third cathode, said second charging resistor forming a timing network with said second charging capacitor for said second thyratron when said first thyratron is conducting and said third charging resistor forming a timing network with said second charging capacitor for said second thyratron when said third thyratron is conducting; a third charging capacitor connected between said third grid and said third cathode; a fourth charging resistor connected between said third grid and said first cathode, said third charging capacitor and said fourth charging resistor forming a timing circuit for said third grid when said first thyratron is conducting; a first source of diode limiting potential having its negative terminal connected to said common junction point and its positive terminal connected to said first grid through said first diode, said first diode being poled to limit the voltage at said first grid to a predetermined positive level; a second source of diode limiting potential having its negative terminal connected to said common junction point, and its positive terminal connected to said third grid through said third diode, said third diode being poled to limit the voltage at said third grid to a predetermined positive level; a first input circuit coupled to said first grid; a second input circuit coupled to said third grid; three cathode resistors; and three load impedance elements, each of said cathode circuits of said thyratrons being individually connected to said common junction point through one of said cathode resistors and one of said load impedance elements.

References Cited in the file of this patent

UNITED STATES PATENTS

| | | |
|---|---|---|
| 2,432,140 | Dehmel | Dec. 9, 1947 |
| 2,432,141 | Dehmel | Dec. 9, 1947 |
| 2,432,142 | Dehmel | Dec. 9, 1947 |
| 2,449,035 | Coffin et al. | Sept. 7, 1948 |
| 2,527,342 | White | Oct. 24, 1950 |
| 2,551,964 | Norton | May 8, 1951 |
| 2,607,528 | McWhirter et al. | Aug. 19, 1952 |